US007019481B2

(12) United States Patent
Kato et al.

(10) Patent No.: US 7,019,481 B2
(45) Date of Patent: Mar. 28, 2006

(54) CARRIAGE DRIVING APPARATUS AND MOTOR CONTROL METHOD

(75) Inventors: Shinya Kato, Nagoya (JP); Daisuke Kozaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/766,914

(22) Filed: Jan. 30, 2004

(65) Prior Publication Data

US 2004/0184860 A1 Sep. 23, 2004

(30) Foreign Application Priority Data

Feb. 4, 2003 (JP) ............................ 2003-027524

(51) Int. Cl.
*G05B 5/01* (2006.01)
*G05B 11/42* (2006.01)

(52) U.S. Cl. ...................... 318/610; 318/618; 318/696; 347/14; 347/19; 347/23

(58) Field of Classification Search ................ 318/800, 318/560, 618, 610
See application file for complete search history.

(56) References Cited

U.S. PATENT DOCUMENTS

| | | | | |
|---|---|---|---|---|
| 5,317,668 | A * | 5/1994 | Kobayashi | 388/811 |
| 5,748,206 | A * | 5/1998 | Yamane | 347/37 |
| 5,998,956 | A * | 12/1999 | Saito | 318/696 |
| 6,114,825 | A * | 9/2000 | Katz | 318/615 |
| 6,411,008 | B1 * | 6/2002 | Otsubo et al. | 310/316.01 |
| 6,600,286 | B1 * | 7/2003 | Tanaka et al. | 318/560 |
| 6,619,778 | B1 * | 9/2003 | Igarashi | 347/19 |
| 6,729,712 | B1 * | 5/2004 | Kobayashi et al. | 347/19 |
| 2001/0007458 | A1 * | 7/2001 | Purcell et al. | 347/19 |
| 2002/0172510 | A1 * | 11/2002 | Kobayashi et al. | 388/800 |
| 2003/0043228 | A1 * | 3/2003 | Igarashi | 347/37 |

FOREIGN PATENT DOCUMENTS

| | | |
|---|---|---|
| JP | A 4-99680 | 3/1992 |
| JP | A 5-254217 | 10/1993 |
| JP | A 7-163182 | 6/1995 |
| JP | A 9-202014 | 8/1997 |

* cited by examiner

*Primary Examiner*—David Martin
*Assistant Examiner*—Elias B. Hiruy
(74) *Attorney, Agent, or Firm*—Oliff & Berridge, PLC

(57) ABSTRACT

A carriage driving apparatus that drives a carriage of a printer or the like by a motor and a motor control method for controlling the motor can substantially eliminate variation in control accuracy among individual apparatuses. Each set of various parameters are determined with respect to each ultimate target speed of the carriage and each moving direction, and contained in a table. Three kinds of tables, i.e. a table for heavy load, a table for light load and a table for standard load in accordance with the difference in load applied to individual drive systems of the carriage, as well as one kind of table for low temperature are prepared and stored on a ROM. It is determined which of the three kinds of tables should be selected at normal temperature by actually driving the carriage in the final step of the manufacturing process.

19 Claims, 12 Drawing Sheets

FIG.9

| MODE | 30i ps | 30i ps | 15i ps | 15i ps | 7.5i ps |  |
|---|---|---|---|---|---|---|
| DIRECTION | FWD | REV | FWD | REV | FWD |  |
| INITIAL PWM VALUE |  |  |  |  |  |  |
| ACCELERATION PROPORTIONAL GAIN |  |  |  |  |  |  |
| ACCELERATION DIFFERENTIAL GAIN |  |  |  |  |  |  |
| TRANSITION PROPORTIONAL GAIN |  |  |  |  |  |  |
| TRANSITION DIFFERENTIAL GAIN |  |  |  |  |  |  |
| CONSTANT SPEED PROPORTIONAL GAIN |  |  |  |  |  |  |
| CONSTANT SPEED DIFFERENTIAL GAIN |  |  |  |  |  |  |
| CONSTANT SPEED INTEGRAL GAIN |  |  |  |  |  |  |
| FIXED OFF TIME |  |  |  |  |  |  |
| FAST DECAY TIME |  |  |  |  |  |  |
| RANGE |  |  |  |  |  |  |

CARRIAGE DRIVING APPARATUS AND MOTOR CONTROL METHOD

BACKGROUND OF THE INVENTION i) Field of the Invention

The present invention relates to a carriage driving apparatus that drives a carriage of a printer or the like by a motor, and a motor control method for controlling the motor. The present invention more particularly relates to a carriage driving apparatus and a motor control method characterized by the determination of parameters used in the control of the motor.

ii) Description of the Prior Art

A conventional carriage of a printer or the like is connected to an endless belt driven by a motor, and is moved in a scanning direction by driving the endless belt through a pulley and the like in accordance with the rotation of the motor. To adjust the moving speed of the carriage to a desired value, the control of the motor is performed based on a variety of, parameters. For example, when the motor is controlled by so-called PID control, in which feedback control is performed using P control (Proportional control), I control (Integral control) and D control (Differential control) together, parameters such as P gain (Proportional gain), I gain (Integral gain) and D gain (Differential gain) are used.

When the apparatus temperature of a printer is low while driving a carriage, oil applied to the mechanism of the printer is hardened, resulting in a larger load to the motor than a load at normal temperature. Then, the apparatus temperature is detected by a sensor, and the control amount is determined in accordance with the detected temperature (see Publication of Unexamined Japanese Patent Application No. 7-163182).

The load applied to the motor for driving the carriage varies also depending on the assembly error or variation present among individual apparatuses such as printers. Conventionally, there is no effective measures to eliminate the influence of such variation in the load among individual apparatuses, which results in variation in the control accuracy among individual apparatuses such as printers.

Therefore, an object of the present invention is to provide a carriage driving apparatus that drives a carriage of a printer or the like by a motor, and a motor control method for controlling a motor, according to which variation in the control accuracy among apparatuses can be substantially eliminated.

SUMMARY OF THE INVENTION

To attain this and other objects, there is provided a carriage driving apparatus which comprises: a motor for driving a carriage; a storage device that stores a plurality of sets of parameters necessary for controlling the motor; and a control device that selects one set of parameters stored by the storage device and controls the motor based on the one set of parameters, wherein the one set of parameters to be selected are determined based on the behavior of the carriage in a constant speed area when the carriage is driven by the motor.

The behavior of the carriage in the constant speed area when the carriage is driven corresponds substantially to the amount of load applied to the drive system of the carriage. By determining the one set of parameters to be selected based on the behavior of the carriage in the constant speed area, the influence of the individual variation with respect to the load on the control can be successfully eliminated.

Accordingly, in the present invention, the influence of the variation of the load caused by the individual assembly error or variation on the control can be substantially eliminated. And thus, occurrence of variation in control accuracy among individual apparatuses is substantially inhibited, which results in provision of products with stable performance.

In another aspect of the present invention, the one set of parameters described above include at least two parameters among P gain, I gain and D gain when controlling the motor by PID control and a variety of parameters which characterize a driver of the motor.

P gain, I gain and D gain when controlling the motor by PID control and the variety of parameters which characterize the driver of the motor has an extremely close relationship with improvement of the control accuracy. The present invention, according to which a set of parameters including at least two of the parameters are selected as described above, provides an additional advantage that the control accuracy may be further improved.

The load applied to the drive system changes also in accordance with the target speed of the carriage in the constant speed area. In a further aspect of the present invention, the motor is driven based on each set of parameters with respect to each target speed of the carriage in the constant speed area, and the one set of parameters to be selected with respect to the each target speed is determined based on the behavior of the carriage in the constant speed area.

According to the present invention constituted as above, changes in load in accordance with the target speed can be coped with, which results in an advantage that the control accuracy may be further improved even when the target speed is variously changed.

In another aspect of the present invention, a set of parameters, based on which the minimum value of the speed of the carriage is the largest when the motor is driven based on the each set of parameters, is determined to be the one set of parameters to be selected with respect to the each target speed. A set of parameters, based on which the speed of the carriage converges to the target speed most appropriately, are selected as the optimum set of parameters. The speed of the carriage usually overshoots once during acceleration time and subsequently undershoots, and then gradually converges to the target speed. In the present invention, a set of parameters based on which the value during the first undershoot in the constant speed area is the closest to the target speed are to be selected.

When the set of parameters to be selected are determined as described above, it is only necessary to observe the behavior of the carriage in the early stage of the control, allowing a simplified process as well as a short-time observation. Accordingly, the present invention provides an additional advantage that the process of determining one set of parameters to be selected may be simplified and accelerated.

In a further aspect of the present invention, a set of parameters, based on which one of the maximum value and the minimum value of the speed of the carriage in the constant speed area is beyond a predetermined range with respect to the target speed, are determined not to be the one set of parameters to be selected with respect to the target speed.

When the maximum value or the minimum value of the speed of the carriage in the constant speed area is beyond a predetermined range with respect to the target speed, it is conjectured that the, set of parameters are not at all suitable for the drive system of the carriage or that some unexpected trouble has occurred. Thus, the set of parameters are determined not to be the one set of parameters to be selected with respect to the target speed. Accordingly, the present invention provides an advantage that the process of determining one set of parameters to be selected may be performed further appropriately, resulting in further improved control accuracy.

As described above, the behavior of the carriage in the constant speed area corresponds substantially to the amount of load applied to the drive system of the carriage. In yet another aspect of the present invention, the storage device stores a plurality of sets of parameters respectively expected to be optimum in accordance with the amount of load to the drive system of the carriage.

According to the present invention, in which one appropriate set of parameters are selected from among the plurality of sets of parameters respectively expected to be optimum in accordance with the amount of load, further improved control accuracy can be achieved.

The load applied to the drive system of the carriage varies also depending on the temperature of the drive system. In a further aspect of the present invention, the carriage driving apparatus further comprises a temperature detection device for detecting the temperature in the vicinity of the drive system of the carriage, and the control device selects the one set of parameters additionally referring to the temperature detected by the temperature detection device.

According to the present invention, there is an advantage that further improved control accuracy regardless of the temperature can be achieved.

At lower temperatures, the influence of the temperature on the load to the drive system of the carriage is extremely large, exceeding the influence of the difference among the individual drive systems. In another aspect of the present invention, the one get of parameters to be selected by the control device at a low temperature is the same regardless of the behavior of the carriage in the constant speed area.

According to the present invention, the process of determining one set of parameters to be selected may be simplified and the amount of required memory can be reduced.

In a further aspect of the present invention, the one set of parameters to be selected by the control device at a low temperature is also determined referring to the behavior of the carriage in the constant speed area.

According to the present invention, the control can be performed reflecting the difference among the individual drive systems, resulting in further improved control accuracy.

In yet another aspect of the present invention, there is provided a carriage driving apparatus which comprises: a motor for driving a carriage; a storage device that stores a plurality of sets of parameters necessary for controlling the motor; a control device that selects one set of parameters stored by the storage device and controls the motor based on the one set of parameters; and a temperature detection device that detects the temperature in the vicinity of the drive system of the carriage, wherein the control device selects the one set of parameters referring to the amount of load to the drive system of the carriage when the carriage is driven by the motor and the temperature detected by the temperature detection device.

According to the present invention, the one set of parameters appropriately correspond to the variation in load among individual drive systems and the temperature of the drive system. Therefore, the influence of the variation in load among individual drive systems on the control as well as occurrence of variation in control accuracy among individual drive systems can be substantially eliminated. Moreover, the present invention provides further improved control accuracy by also referring to the temperature when selecting the one set of parameters.

In a further aspect of the present invention, the storage device stores a plurality of sets of parameters respectively expected to be optimum in accordance with the amount of load to the drive system of the carriage and the temperature in the vicinity of the drive system of the carriage.

According to the present invention, further improved control accuracy can be achieved by selecting an appropriate set of parameters from among the plurality of sets of parameters.

In yet another aspect of the present invention, there is provided a motor control method for driving a motor based on one set of parameters selected from among a plurality of sets of parameters necessary for driving and controlling the motor and stored by a storage device, wherein toad applied to the motor is previously found out and the one set of parameters are selected based on the load. According to the present invention, it is possible to substantially eliminate the influence of the variation in load, among individual motors on the control of the motor and to control the motor properly by selecting an appropriate set of parameters in accordance with the amount of load.

The load applied to the drive system of the motor varies also depending on the temperature of the drive system. In a further aspect of the present invention, there is provided a motor control method, wherein the temperature in the vicinity of the drive system of the motor is detected and the one set of parameters are selected additionally referring to the detected temperature.

According to the present invention, there is an advantage that further improved control accuracy regardless of the temperature can be achieved.

The motor control method as described above may be applied to the driving of various mechanisms such as a scanner other than the driving of a carriage as well as to an apparatus other than a printer.

BRIEF DESCRIPTION OF THE DRAWINGS

A preferred embodiment according to the present invention will now be described with reference to the drawings in which:

FIG. 9 is an explanatory diagram illustrating an example of tables stored on a ROM in the control system;

DETAILED DESCRIPTION OF THE PREFERRED EMBODIMENT

In the present embodiment, the present invention is applied to a multifunction apparatus 100 with a printer function, a copier function, a scanner function, a facsimile function and a telephone function.

Figure 1:
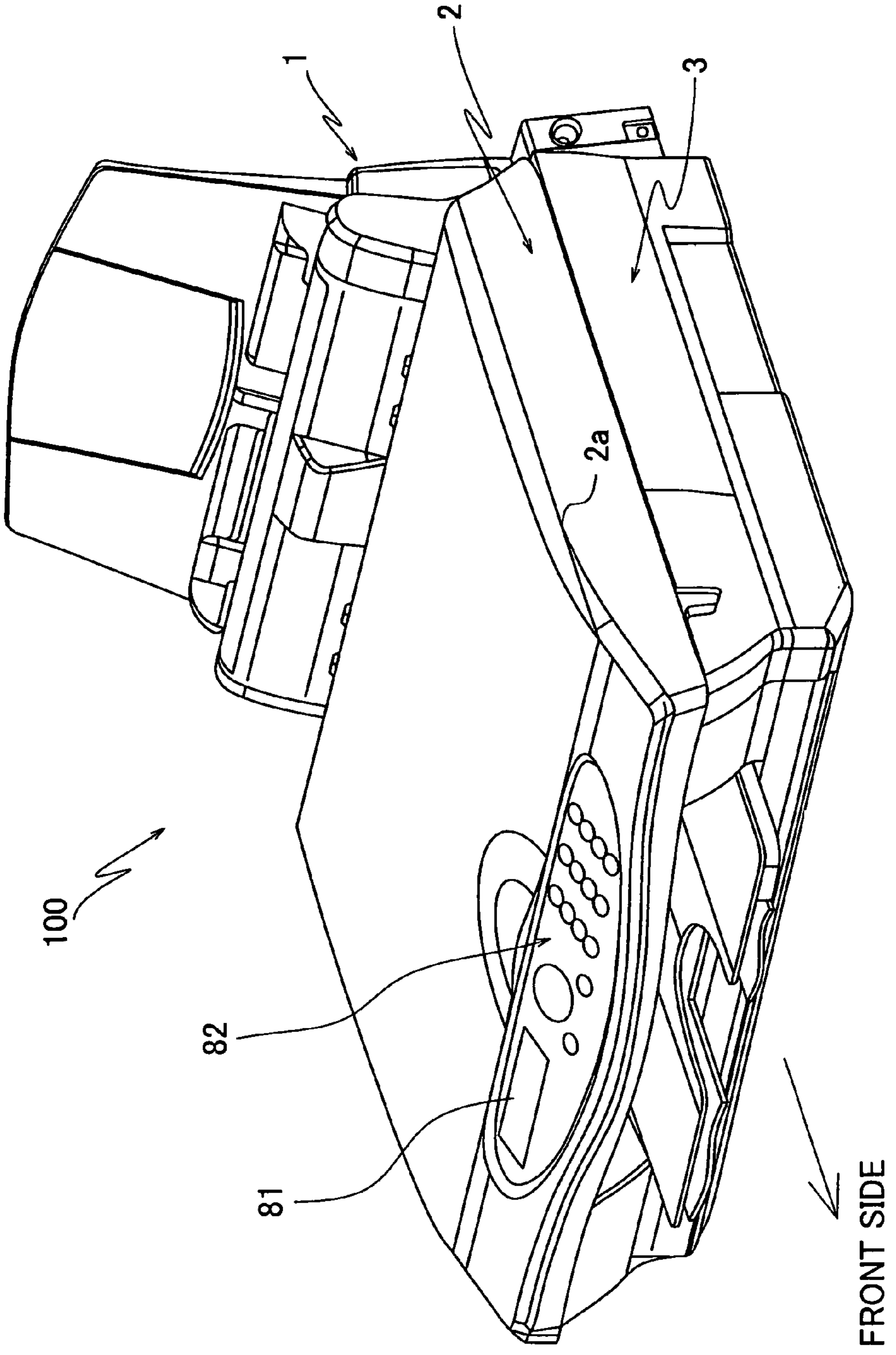
FIG. 1 is a perspective view illustrating the external appearance of a multifunction apparatus according to the present invention.

As shown in FIG. 1, the multifunction apparatus 100 is provided with a paper feed unit 1 at its rear end, a document scanning unit 2 for the copier function in its upper portion and in front of the paper feed unit 1, and an ink jet printer 3 that achieves the printer function under and throughout the lower portion of the document reading unit 2.

The document reading unit 2 is designed, although not shown, to be pivotable in upward and downward directions around a horizontal axis at its rear end. When an upper lid 2*a* is opened upward, there are provided a mounting glass for mounting a document thereon, and an image scanner device for scanning the document under the mounting glass. By manually lifting the document scanning unit 2 upward, replacement of a not-shown ink cartridge in the ink jet printer 3 and maintenance of the printing mechanism 10 (see FIG. 2) can be performed.

Figure 2:
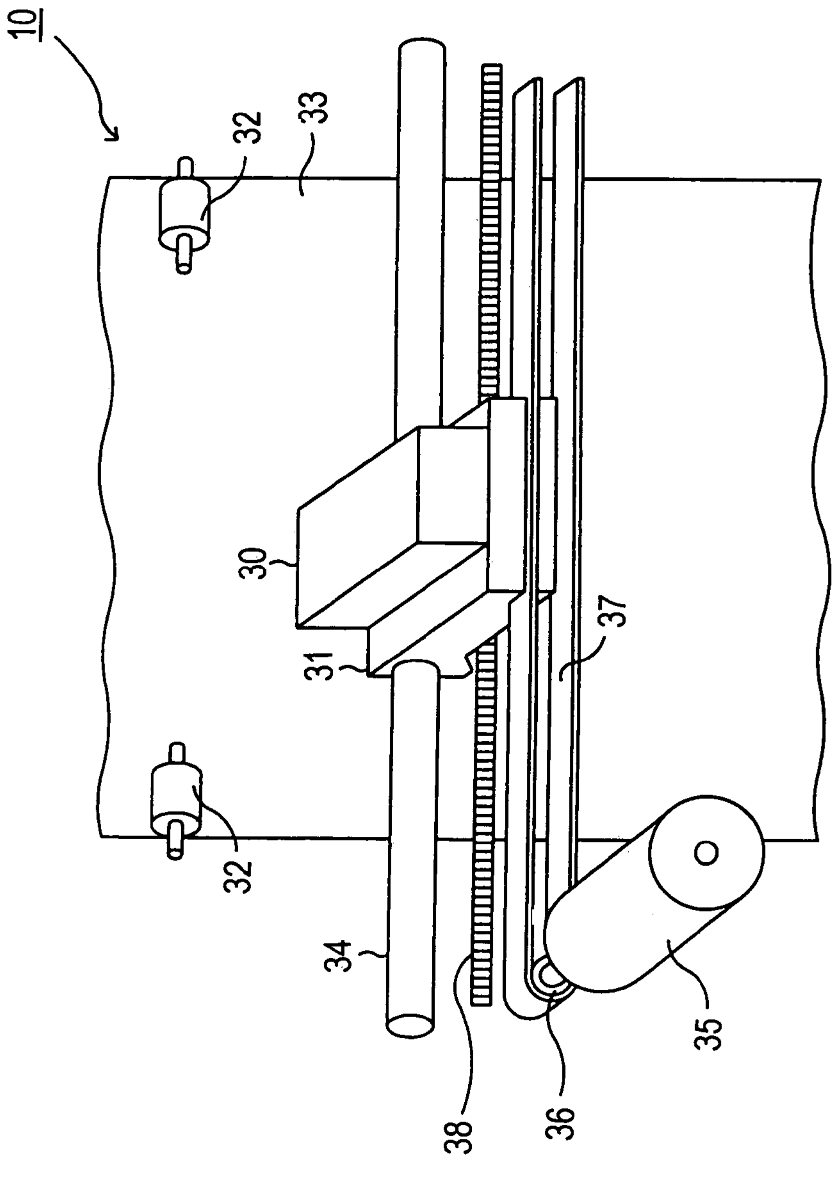
FIG. 2 is an explanatory view schematically illustrating the structure of the printing mechanism of the multifunction apparatus.

FIG. 2 is an explanatory view schematically illustrating the structure of the printing mechanism 10. As shown in FIG. 2, printing paper 33 fed by the paper feed unit 1 is transferred by retainer rollers 32 and other components. A guide shaft 34 is provided in the width direction of the printing paper 33. The guide shaft 34 is inserted through a carriage 31 provided with a print head 30 for performing printing by discharging ink from a nozzle toward the printing paper 83.

The carriage 31 is connected to an endless bolt 37 provided along the guide shaft 34, and the endless belt 37 is spread between a pulley 86 of a CR motor 35 disposed near one end of the guide shaft 34 and an idle pulley (not shown) disposed near the other end of the guide shaft 34. Specifically, the carriage 31 is designed to reciprocate in the width direction of the printing paper 33 (i.e. the scanning direction) along the guide shaft 34 by the driving force of the CR motor 35 transmitted through the endless belt 37.

A timing slit 38 provided with slits having a specified width at specified intervals (for example, 1/150 inch or approximately 0.17 mm) is disposed under and along the guide shaft 34. Under the carriage 31 is disposed a detection portion comprising a photointerruptor including at least one light emitting element and two or more light receiving elements arranged on both sides of the timing slit 38 and facing with each other. The detection portion comprising the photointerruptor constitutes a linear encoder 39 (see FIG. 5) together with the above-mentioned timing slit 38.

Figure 3:
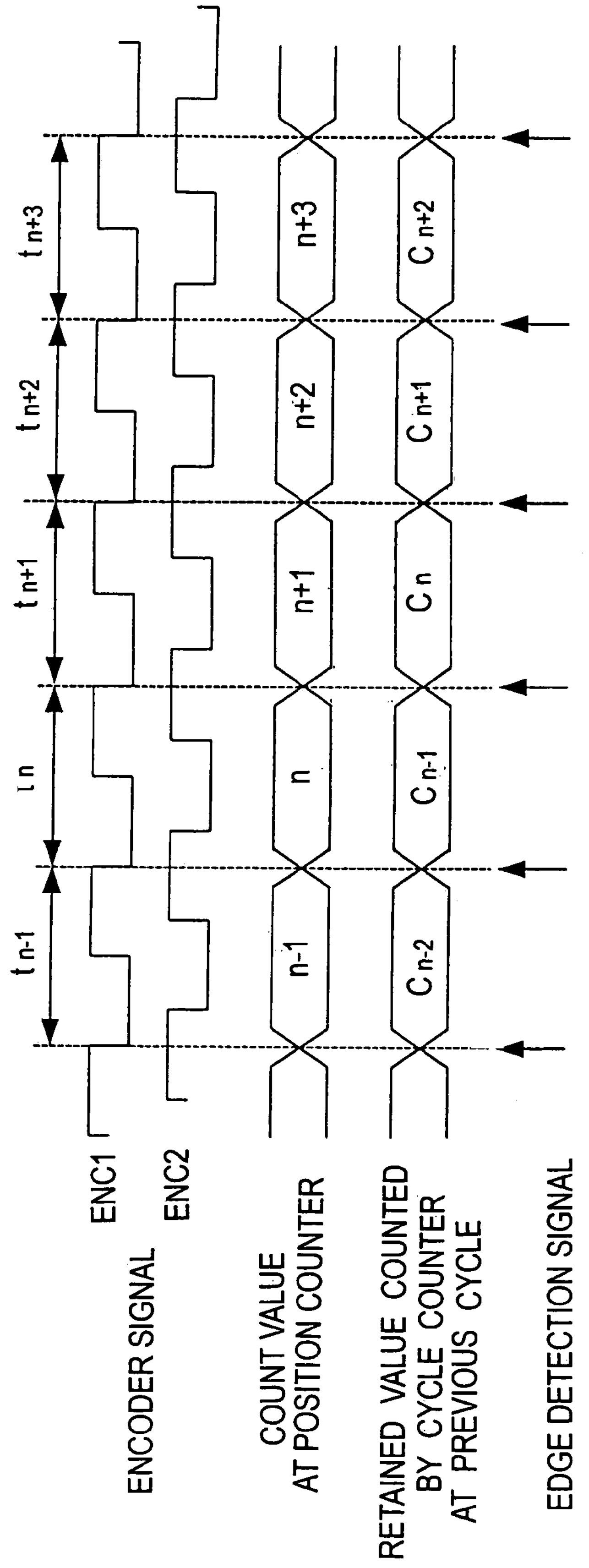
FIG. 3 is a schematic diagram of encoder signals of a linear encoder equipped in the carriage of the printing mechanism and a variety of signals generated based on the encoder signals.

The detection portion constituting the linear encoder 39 outputs, as shown in FIG. 3, two kinds of encoder signals ENC1, ENC2 shifted by approximately ¼ cycle with each other. When the moving direction of the carriage 31 is the forward direction, i.e. from a home position. (the leftmost position in FIG. 1) toward the idle pulley, ENC1 has a phase advanced by approximately ¼ cycle relative to ENC2. When the moving direction of the carriage 31 is the reverse direction, i.e. from the idle pulley toward the home position, ENC1 has a phase delayed by approximately ¼ cycle relative to ENC2.

Figure 4:
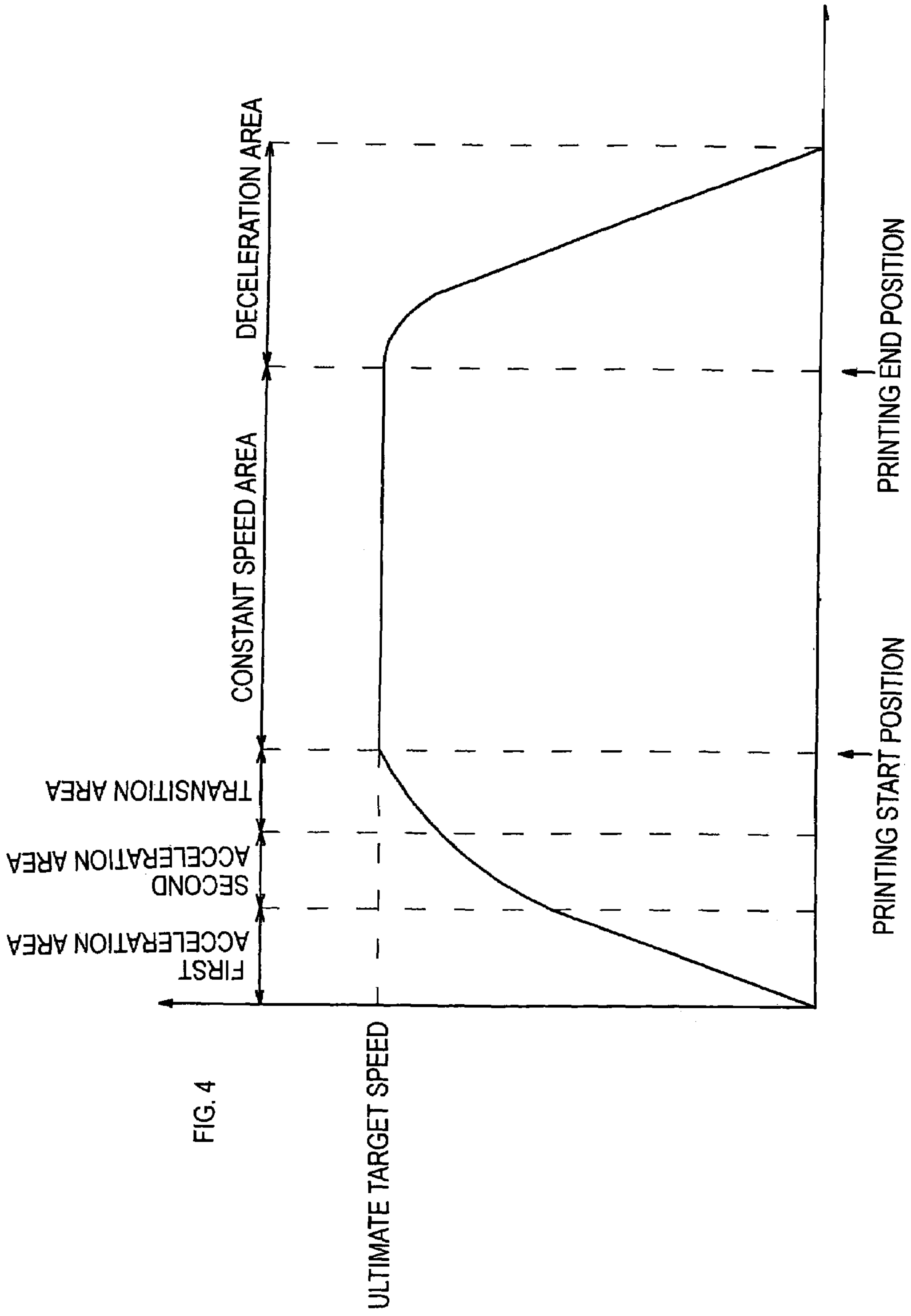
FIG. 4 is an explanatory diagram schematically illustrating the operation of the carriage.

FIG. 4 is an explanatory diagram schematically illustrating the operation of the carriage 31. As shown in FIG. 4, the carriage 31 stays at the home position set in the vicinity of the end of the guide shaft 34 on the side of the pulley 35 or at a position where the printing last time was stopped (hereinafter referred to as a starting point which indicates the movement start position of the carriage 31.) When the printing process is started, the carriage 31 is accelerated so as to reach an ultimate target speed within a distance to a predetermined printing start position. Then, the carriage 31 is moved at a constant speed to a predetermined printing end position. Upon passing the printing end position, the carriage 31 is decelerated to a halt. Hereinafter, an area from the starting point to the printing start position is referred to as the acceleration area (which specifically is divided into a first acceleration area, a second acceleration area and a transition area). An area from the printing start position to the printing end position is referred to as a "constant speed area". An area from the printing end position to a position at which the carriage 81 is stopped is referred to as a "deceleration area".

Figure 5:
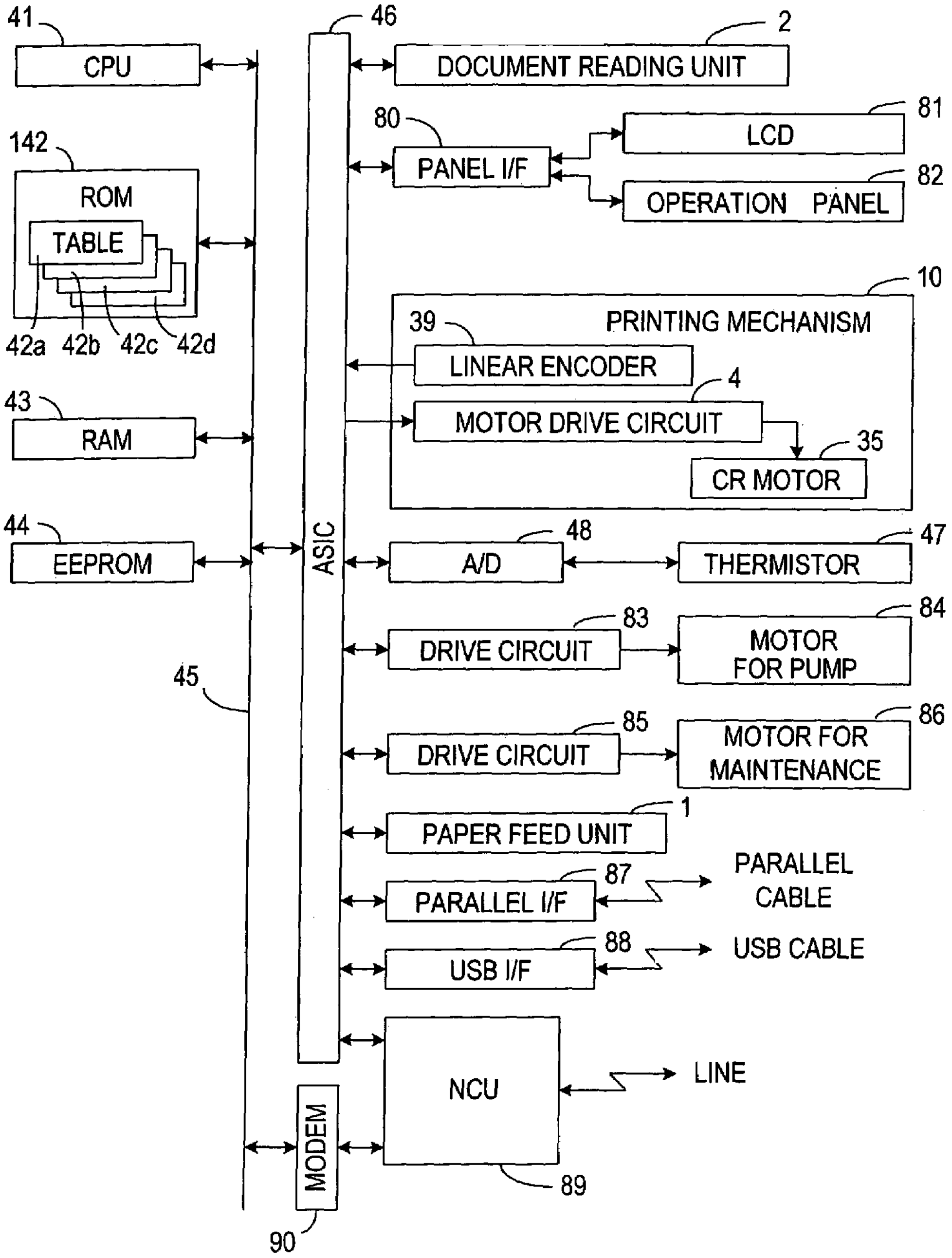
FIG. 5 is a block diagram illustrating the constitution of the control system of the multifunction apparatus.

FIG. 5 is a block diagram illustrating the constitution of the control system of the multifunction apparatus 100. As shown in FIG. 5, a CPU 41 for performing a variety of computation, a ROM 142 for storing a various programs, after-mentioned tables 42*a*–42*d* and others in an unrewritable manner, a RAM 43 for temporarily storing a variety of data, and an EEPROM 44 capable of rewriting the stored content by providing a specific electric signal are interconnected through a bus 45 so as to be capable of transmitting/receiving signals to/from one another. In addition, an ASIC (Application Specific Integrated Circuit) 46 is connected to the bus 45.

The CR motor 85 is connected to the ASIC 46 through a motor drive circuit 4 in addition to the paper feed unit 1 and the document scanning unit 2 connected to the ASIC 46. Signals from the above-mentioned linear encoder 39 are input into the ASIC 46, while signals from a thermistor 47 for measuring the apparatus temperature of the multifunction apparatus 100 are input into the ASIC 46 through an AID converter 48. The thermistor 47 is provided at a place within the multifunction apparatus 100 which is to be affected little by the heat from a substrate or the like. To the ASIC 46, additionally, an LCD 81 and an operation panel 82 (see FIG. 1) are connected through a panel interface (panel I/F) 80, a motor for pump 84 is connected through a motor drive circuit 83, and a motor for maintenance 86 is connected through a motor drive circuit 85, respectively.

Furthermore, a parallel interface (parallel I/F) 87 capable of connecting a parallel cable to, a USB interface (USB I/F) 88 capable of connecting a USB cable to and an NCU (Network Control Unit) 89 capable of connecting a line such as a telephone line to are connected to the ASIC 46 to allow connection with external devices. The NCU 89 is also connected to the bus 45 through a modem 90.

Figure 6:
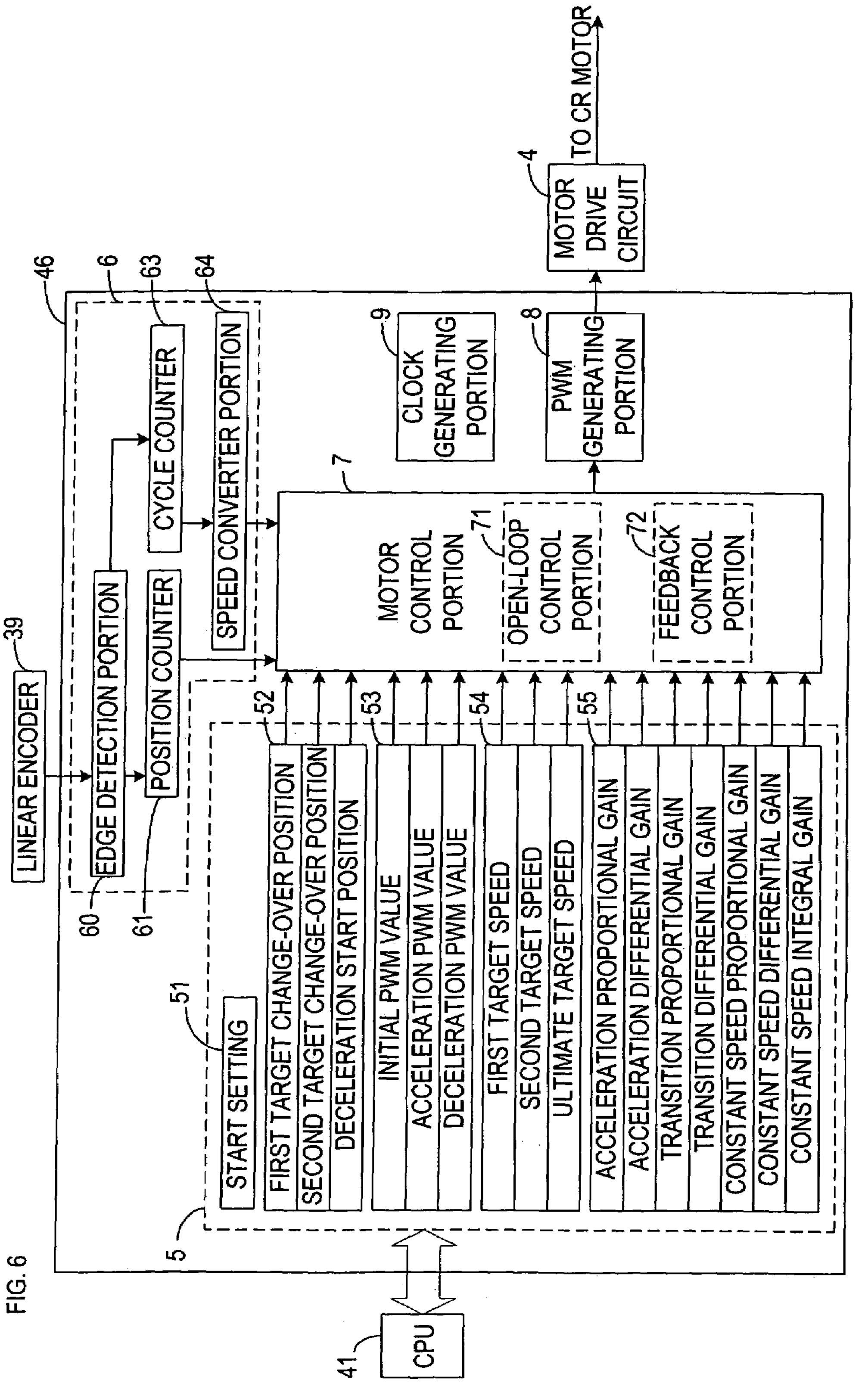
FIG. 6 is a block diagram illustrating in detail the constitution with respect to the control of a CR motor in an ASIC in the control system.

FIG. 6 is a block diagram illustrating the constitution of the ASIC 46 in detail with respect to the control of the CR motor 35. As shown in FIG. 6, The ASIC 46 is provided with a group of registers 5 for storing a variety of parameters to be used for controlling the CR motor 35, a carriage positioning portion 6 for receiving encoder signals ENC1, ENC2 from the linear encoder 39 and calculating the position, the moving speed and the moving direction of the carriage 81, a motor control portion 7 for generating a motor control signal for controlling the rotating speed of the CR motor 35, a PWM generating portion 8 for generating a PWM signal having a duty ratio corresponding to the motor control signal generated by the motor control portion 7, and a clock generating portion 9 for generating a clock signal with a sufficiently shorter cycle compared with the encoder signals ENC1, ENC2 and providing the clock signal to each portion within the ASIC 46.

The group of registers 5 include a start setting register 51 for starting the CR motor 35, a position register. 52 for setting a border position between each two of the above-described areas regarding the movement of the carriage 31, a PWM value register 53 for setting a variety of PWM values used when controlling the rotating speed of the CR motor 35 by open-loop control, a target speed register 54 for setting a target speed of the carriage 31 in each of the above-described areas, and a gain register 55 for setting a variety of gains used when controlling the rotating speed of the CR motor 35 by feedback control. As shown in FIG. 6, a first change-over position, a second change-over position and a deceleration start position are set in the position register 52, while an initial PWM value, an acceleration PWM value and a deceleration PWM value are set in the PWM value register 53. Also, a first target speed, a second target speed and an ultimate target speed are registered in the target speed register 54, while an acceleration proportional gain, an acceleration differential gain, a transition proportional gain, a transition differential gain, a constant speed differential gain and a constant speed integral gain are set in the gain register 55.

The carriage positioning portion 6 is provided with an edge detection portion 60 and a position counter 61. The edge detection portion 60 detects, based on the encoder signals ENC1, ENC2 from the linear encoder 39, edge detection signals (here an edge of ENC1 while ENC2 is at a high level) indicating the start/end of each cycle of the encoder signal ENC1 and the rotating direction of the CR motor 36 (i.e. the forward direction when the edge detection signals indicate trailing edges of ENC1, and the reverse direction when the edge detection signals indicate a leading edge of ENC1).

The position counter 61 detects what number slit from the home position the carriage 31 is at by counting up based on the edge detection signals when the rotating. direction of the CR motor 35 detected by the edge detection portion 60 and thus the moving direction of the carriage 31 is the forward direction, while by counting down based on the edge detection signals when the rotating direction of the CR motor 35 is the reverse direction. In other words, each position set in the position register 52 in the group of registers 5 is indicated by a count value at the position counter 61.

The carriage positioning portion 6 is further provided with a cycle counter 63 for counting generating intervals of the edge detection signals from the edge detection portion 60 by clock signals, and a speed converter portion 64 for calculating the moving speed of the carriage 31 based on the distance (1/150 inch) between the slits in the timing slit 38 and time $t_{n-1}$ (=$C_{n-1}$×clock cycle) which is specified by a retained value $C_{n-1}$ counted by the cycle counter 63 at the previous cycle of the encoder signal ENC1.

The motor control portion 7 outputs control signals as described below based on these data (the position and the moving speed of the carriage 31) input from the carriage positioning portion 6 and a variety of data set in the group of registers 5. Specifically, the motor control portion 7 includes an open-loop control portion 71 for generating a motor control signal by open-loop control and a feedback control portion 72 for generating a motor control signal by feedback control, both based on the input data.

The open-loop control portion 71 performs open-loop control from when the carriage 81 starts its movement until the carriage 31 reaches the first target change-over position or the first target speed. Specifically, the control is performed by first generating a motor control signal based on the initial PWM value, and then adding a given number of the acceleration PWM values per given time period. Then, the feedback control portion 72 performs feedback control (PD control) based on the second target speed as well as the acceleration proportional gain and the acceleration differential gain until the carriage 31 reaches the second target change-over position or the second target speed. The feedback control will be described in detail later.

Subsequently, the feedback control portion 72 performs feedback control (PD control) based on the ultimate target speed as well as the transition proportional gain and the transition differential gain. Once the carriage 51 enters the constant speed area, the feedback control portion 72 performs feedback control (PID control) based on the ultimate target speed as well as the constant speed proportional gain, the constant speed differential gain, and the constant speed integral gain. When the carriage 31 reaches the deceleration start position, the open-loop control portion 71 performs open-loop control by subtracting a given number of the deceleration PWM values per given time period.

Figure 7:
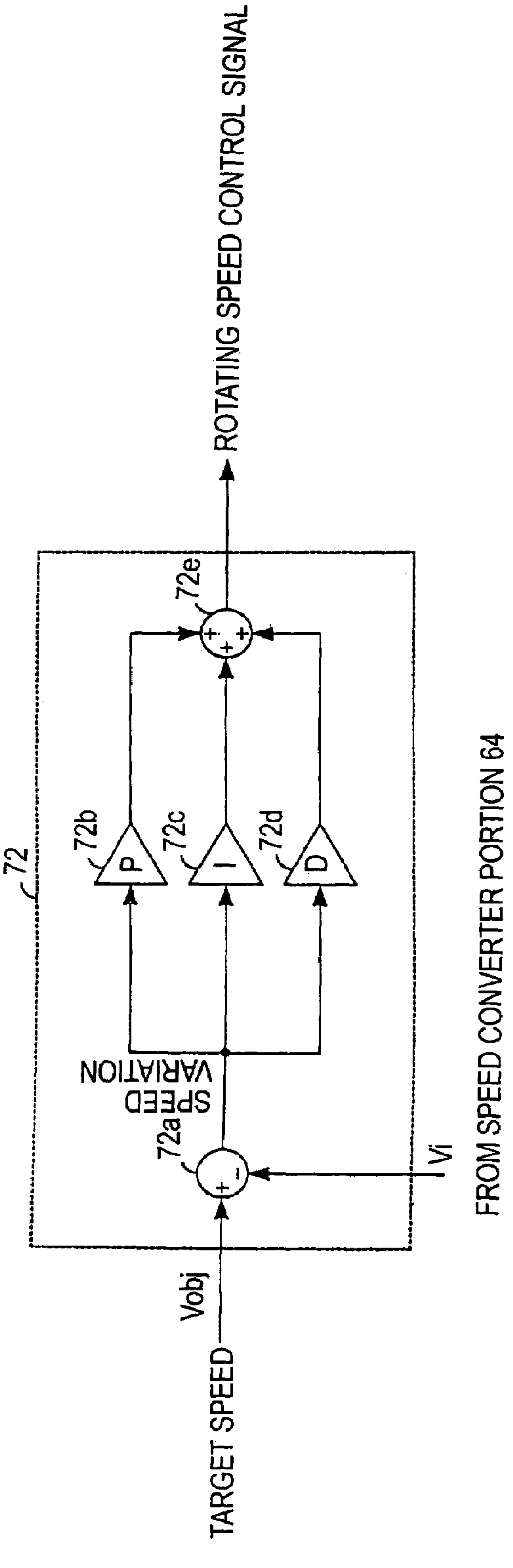
FIG. 7 is a block diagram illustrating in detail the constitution of a feedback control portion in the ASIC.

As shown in FIG. 7, the feedback control portion 72 includes a subtracter 72*a* for subtracting the moving speed Vi of the carriage 31 calculated by the speed converter portion 64 from a target speed Vobj input at a time point in order to calculate a speed deviation, a proportional calculator 72*b* for multiplying the speed deviation calculated by the subtracter 72*a* by the proportional gain, which is a stored value in the gain register 55, an integral calculator 72*c* for integrating the speed deviation and multiplying the integrated value by the integral gain, which is a stored value in the gain register 55, a differential calculator 72*d* for differentiating the speed deviation and multiplying the differentiated value by the differential gain, which is a stored value in the gain register 55, and an adder 72*e* for adding all the calculated values calculated by the proportional calculator 72*b*, the integral calculator 72*c* and the differential calculator 72*d*, and then outputting the added value as a motor control signal. The feedback control portion 72 is designed to perform so-called PID control, while is able to perform the above described PD control when operated with the integral gain set to 0

Figure 8:
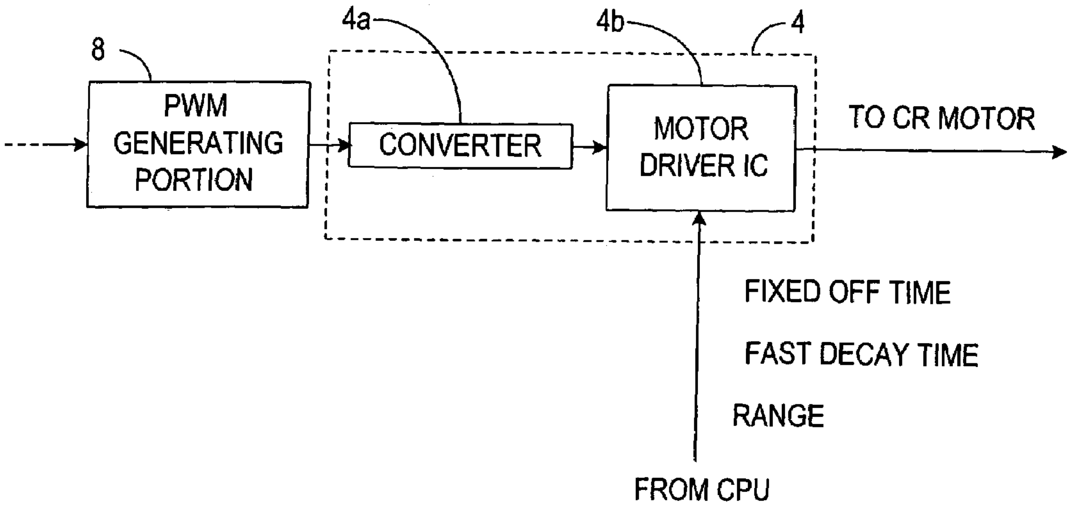
FIG. 8 is a block diagram illustrating the constitution of a motor drive circuit in the control system.

The motor control signal obtained as a result of these calculations is turned into a PWM signal at the PWM generating portion 8, and the PWM signal is input to the motor drive circuit 4. As shown in FIG. 8, the motor drive circuit 4 includes a converter 4*a* for converting the PWM signal into a target current value to be applied to the CR motor 35 and a motor driver IC4*b* for performing PWM control such that the current applied to the CR motor 35 equals the target current value. In the present embodiment, an "SC901502" (a product name, produced by MOTOROLA) is used as the motor driver IC4*b*. According to the motor driver IC4*b*, it is possible to set a fixed off time of the PWM by inputting a fixed off time from the CPU 41, to set a time when the applied current decays rapidly while the PWM is off by inputting a fast decay time, and to change the range by inputting a range from the CPU 41.

FIG. 9 is an explanatory diagram showing an example of tables 42*a*–42*s* stored on the ROM 142. The tables 42*a*–42*s*, as shown in FIG. 9, contain respective sets of parameters, such as the initial PWM value, acceleration proportional gain, acceleration differential gain, transition proportional gain, transition differential gain, constant speed proportional gain, constant speed differential gain, constant speed integral gain, fixed off time, fast decay time, and range corresponding to the ultimate target speed (Mode) of the carriage 31, such as 30 ips (inch per second) and 15 ips, as well as to the moving direction of the carriage 31 (i.e., the forward direction=FWD, the reverse direction=REV).

Also, in the present embodiment, three cases of a heavy load case, a light load case and a standard load case are prepared in accordance with the difference in load among individual drive systems of the carriage 31 (and thus the drive systems of the CR motor 35). With respect to each of these cases, three kinds of tables 42*a*–42*c* containing the above parameters expected to be optimum at normal temperature and one kind of table 42*d* containing the above parameters expected to be optimum at lower temperatures are stored on the ROM 142.

In the present embodiment, the normal temperature means the apparatus temperature of 18° C. or higher (in this case, the ambient air temperature is usually 7° C.–8° C. or higher), while the lower temperatures mean temperatures lower than the above specified normal temperature. At lower temperatures, the influence of the temperature on the load to the drive system of the carriage 31 is extremely large, exceeding the influence of the difference among the individual drive systems. This is the reason why just one kind of table 42*d* is prepared corresponding to lower temperatures regardless of the load in the present embodiment.

A process performed in the multifunction apparatus 100 constituted as above according to the present embodiment will next be described. FIG, 10 is a flowchart showing the table setting process executed by the CPU 41 in the final step of the manufacturing process of the multifunction apparatus 100 or during maintenance by a service technician. This process is executed in the environment with, a normal or a slightly higher ambient temperature(20° C.–28° C.), for example, in the above manufacturing process.

Figure 10:
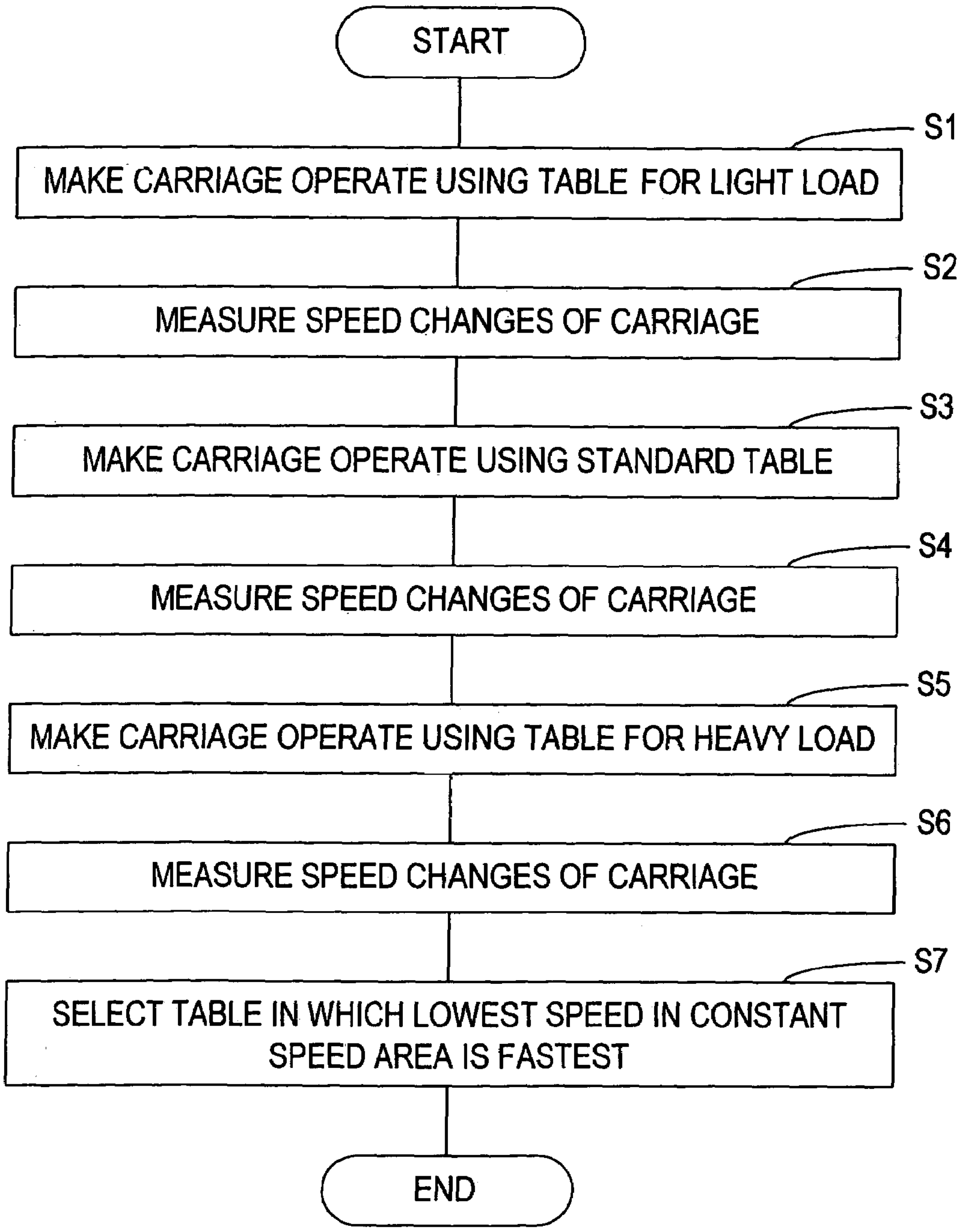
FIG. 10 is a flowchart, illustrating the table determination process performed in the control system.

As shown in FIG. 10, when starting the process, the CPU 41 first makes the carriage 31 operate using a table 42*a* for a light load in S1 (S means a step. Hereinafter the same in the following paragraph). In S2, speed changes of the carriage 31 when the carriage 31 operates in S1 are measured. In S1, the carriage 31 is made to operate under respective conditions of the variety of ultimate target speeds and the both forward and reverse directions shown in FIG. 9. Then, in S2, the speed changes, particularly from when the carriage 31 enters the constant speed area until when a first speed undershoot occurs, are measured regarding the respective conditions.

Similarly, in S3 and S4, the carriage 31 is made to operate in accordance with a standard table 42*b* (S3), and the speed changes during the operation are measured (S4). Also similarly, in S5 and S6, the carriage 31 is made to operate in accordance with the table for heavy load 42*c* (S5), and the, speed changes during the operation are measured (S6). In subsequent S7, selection of a table in which the lowest speed in the constant speed area is the fastest among the tables 42*a*–42*c* is performed.

Figure 11:
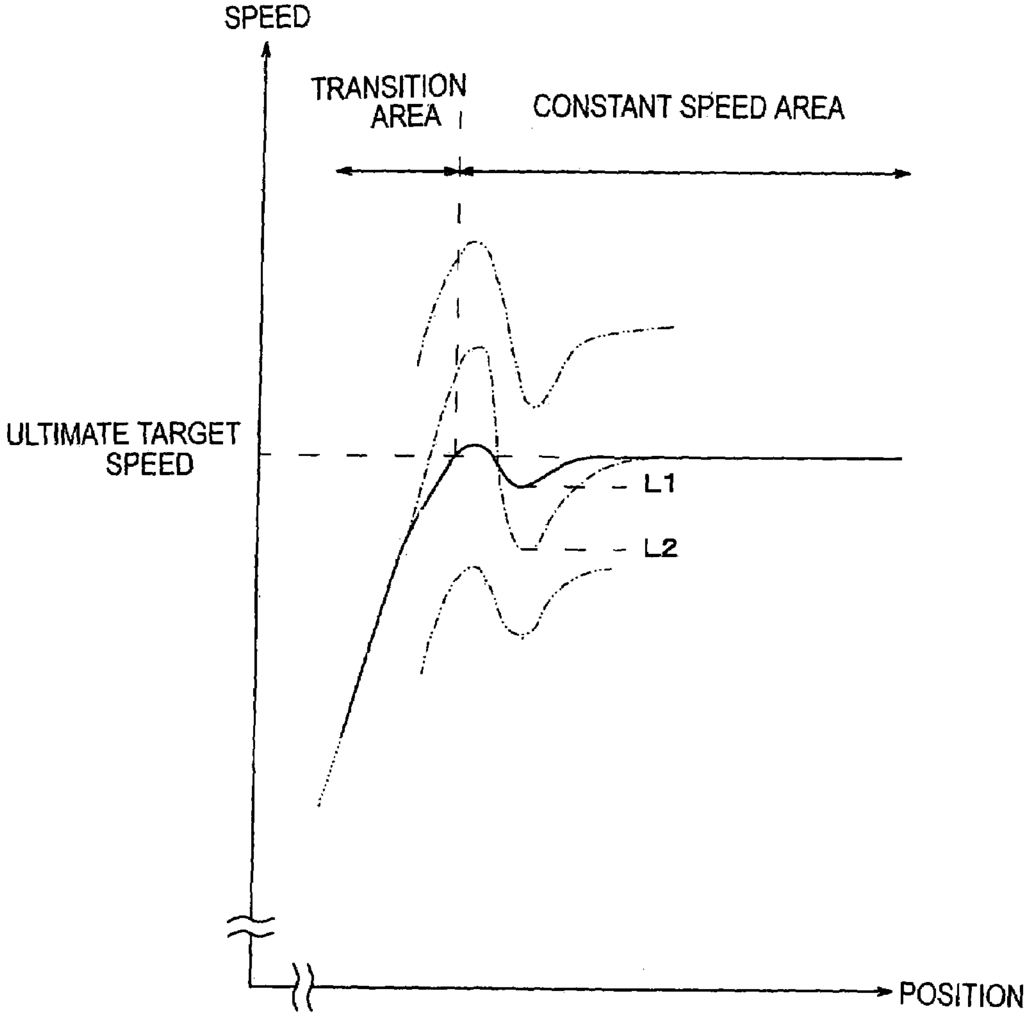
FIG. 11 is an explanatory diagram illustrating the table selection principle in the table determination process.

FIG. 11 shows an example in which the lowest speed during an undershoot of speed in the constant speed area is L1 as indicated by a solid line when the carriage 31 is made to operate using one table 42, while the lowest speed is L2 (<L1) as indicated by a chain line when the carriage 31 is made to operate using another table 42. In this case, it is considered that the former table 42 is more suitable for the drive system of the carriage 31, and, therefore, the former table 42 is selected in S7.

In S7, if the maximum value or the minimum value of the speed of the carriage 31 in the constant Speed area when using a table 42 is beyond a predetermined range with respect to the ultimate target speed, the table 42 is not selected. For example, if even the speed during an overshoot is lower than the ultimate target speed or even the speed during an undershoot is higher than the ultimate target speed as indicated by a chain double-dashed line in FIG. 11, it is conjectured that the table 42 used in such a case is not at all suitable for the drive system of the carriage 31, or that some unexpected trouble has occurred. Thus, in S7, the table 42 according to which speed changes as described above have been measured is eliminated from the selection.

As described above, the optimum table 42 for the drive system of the carriage 31 in the multifunction apparatus 100 is selected in S7. Selections are also performed under respective conditions of the variety of ultimate target speeds and the both forward and reverse directions, and each identification number and the like of each selected table 42 corresponding to each ultimate target speed and each direction is stored on the EEPROM 44. When storage on the EEPROM 44 is completed, the CPU temporarily terminates the present process.

Figure 12:
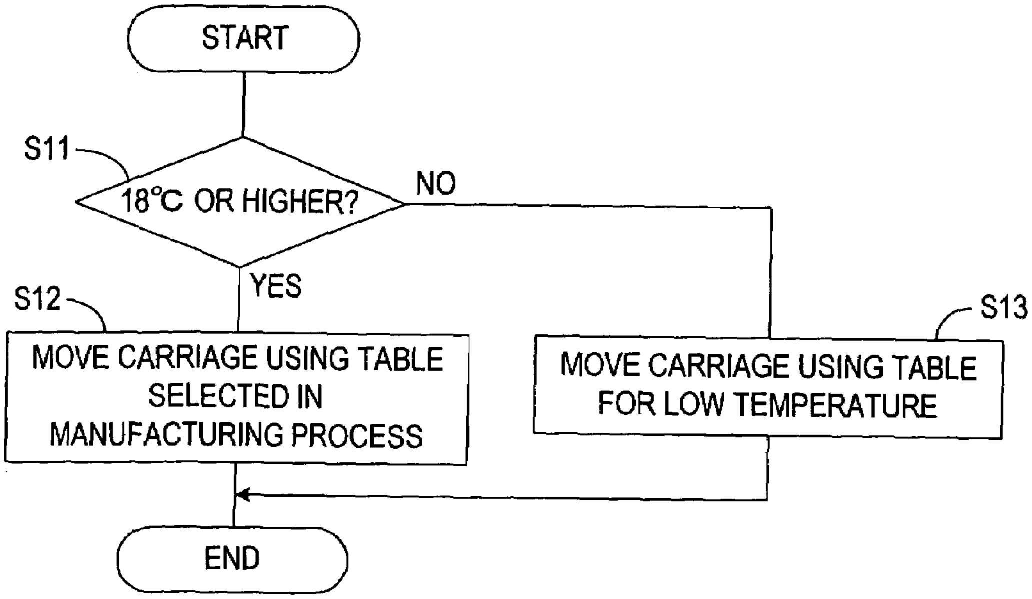
FIG. 12 is a flowchart illustrating the carriage moving process performed in the control system.

FIG. 12 is a flowchart showing the carriage moving process executed by the CPU 41 when a user uses the multifunction apparatus 100. When starting the process, the CPU 41 determines whether or not the apparatus temperature is 18° C. or higher through the thermistor 47 (S11).

If it is determined that the apparatus temperature is normal, or 18° C. or higher (S11: YES), a table 42*a* is selected in accordance with the ultimate target speed in the present job (corresponding to the resolution necessary for the job) from the tables 42 selected in the above described table setting process in FIG. 10. The carriage 31 is moved by using the selected table 42*a*, and then the present process is temporarily terminated.

On the other hand, if it is determined that the apparatus temperature is lower than 18° C. (S11: NO), the carriage 31 is moved by using the table for low temperature 42*d*, and then the present process is temporarily terminated. During the movement of the carriage 31 by the carriage moving process, printing data is processed by another routine, and ink is discharged from the print head 30.

In the multifunction apparatus 100 of the present embodiment, as described above, the control of the CR motor 35 is performed by using the table 42 previously selected based on the behavior of the carriage 31 in the constant speed area. Since the selected table 42 properly reflects the variation among the individual multifunction apparatuses 100 with respect to the load to the drive system of the carriage 31, the influence of the variation among the individuals with respect to the load on the control can be sufficiently eliminated by the control using the table 42. Accordingly, it will be possible to substantially prevent occurrence of the variation in control accuracy with respect to the driving of the carriage 31 among the individual multifunction apparatuses 100.

Furthermore, in the present embodiment, each optimum table 42 is set with respect to each of the ultimate target speeds of the carriage 31 as well as each of the forward and reverse directions, the control accuracy may be further imp roved. In the present embodiment, in which the apparatus temperature is also referred to and the different table 42*d* is used at a low temperature, the control accuracy may be further improved regardless of the temperature.

It is to be understood that the present invention is not limited to the above described embodiment, but may be practiced in various forms within the scope not departing from the gist of the present invention. For example, the table setting process in FIG. 10 may be executed when the multifunction apparatus 100 is turned on or every time printing of a predetermined number of pages has been completed. In this case, even when the load is changed by, for example, a change in tension of the endless belt 37 due to deterioration with age, appropriate countermeasures can be taken.

While a table 42 in which the lowest speed during an undershoot is the fastest is selected in the above described table setting process, a table 42 in which the highest speed during an overshoot is the slowest or a table in which the amplitude of changes in speed is the smallest may be selected. According to the present embodiment, however, it is only necessary to observe the behavior in speed immediately after the carriage 31 enters the constant speed area, which may simplify and accelerate the table setting process.

Moreover, it may be possible to repeat the measurement of the lowest speed or the like a plurality of times under the same conditions and select a table 42 based on the accumulated value (i.e. the average value). In this case, an optimum table 42 can be selected in a more secure manner, which may result in further improved control accuracy.

Further, it may be possible to prepare, as the table for low temperature 42*d*, three kinds of tables, i.e. a table for heavy load and low temperature, a table for standard load and low temperature and a table for light load and low temperature, in accordance with the load to the drive system of the carriage 31. By Selecting a table from among the three, further improved control accuracy can be achieved. In addition to the table for low temperature 42*d*, a table for high temperature 42 may be prepared.

What is claimed is:

1. A carriage driving apparatus comprising:

a motor for driving a carriage;

a storage device that stores a plurality of sets of parameters necessary for controlling the motor; and a control device, wherein:

the control device controls operation of the carriage using a first set of the plurality of sets of parameters and detects a first behavior of the carriage in a constant speed area, after controlling the operation of the carriage using the first set of the plurality of sets of parameters, the control device controls operation of the carriage using a second set of the plurality of sets of parameters and detects a second behavior of the carriage in the constant speed area, and after controlling the operation of the carriage using at least the first set and the second set of the plurality of sets of parameters, the control device selects one of the plurality of sets of parameters based on the detected first behavior and the detected second behavior.

2. The carriage driving apparatus as set forth in claim 1, wherein the selected set of parameters includes at least two parameters relating to P gain, I gain and D gain for controlling the motor by PID control and a variety of parameters that characterize a driver of the motor.

3. The carriage driving apparatus as set forth in claim 1, wherein the motor is driven based on a target speed of the carriage in the constant speed area, and the one of the plurality of sets of parameters to be selected for the target speed is determined based on the detected behaviors of the carriage in the constant speed area.

4. The carriage driving apparatus as set forth in claim 3, wherein one of the detected behaviors is a moving speed of the carriage and the selected one of the plurality of sets of parameters corresponds to the set of parameters based on which a minimum value of the detected moving speed of the carriage is largest.

5. The carriage driving apparatus as set forth in claim 3, wherein one of the detected behaviors is a moving speed of the carriage and each of the plurality of sets of parameters based on which one of a maximum value and a minimum value of the detected moving speed of the carriage in the constant speed area is beyond a predetermined range for the target speed is disqualified from being the selected one of the plurality of sets of parameters.

6. The carriage driving apparatus as set forth in claim 1, wherein the storage device stores a plurality of sets of parameters respectively expected to be optimum in accordance with a plurality of load amounts to which a drive system of the carriage can be subjected.

7. The carriage driving apparatus as set forth in claim 1, further comprising a temperature detection device for detecting temperature in a vicinity of a drive system of the carriage, wherein the temperature detected by the temperature detection device is used by the control device to select one of the plurality of sets of parameters.

8. A carriage driving apparatus as set forth in claim 6, further comprising a temperature detection device for detecting temperature in a vicinity of a drive system of the carriage, wherein the storage device stores a set of parameters expected to be optimum in accordance with respective detected temperatures, as detected by the temperature detection device.

9. The carriage driving apparatus as set forth in claim 7, wherein if the temperature detected by the temperature detection device is at or below a predetermined low temperature, the control device selects one of the plurality of sets of parameters based on the detected temperature and the detected behavior of the carriage in the constant speed area.

10. The carriage driving apparatus as set forth in claim 7, wherein if the temperature detected by the temperature detection device is at or below a predetermined low temperature, a predetermined one of the plurality of sets of parameters is selected regardless of the detected behavior of the carriage in the constant speed area.

11. The carriage driving apparatus as set forth in claim 7, wherein the storage device stores a plurality of sets of parameters respectively expected to be optimum in accordance with a plurality of load amounts to which the drive system of the carriage can be subjected and the detected temperature in the vicinity of the drive system of the carriage.

12. A motor control method for driving a carriage based on a selected one set of parameters selected from a plurality of sets of parameters useable for driving and controlling a motor and stored by a storage device, the motor control method comprising:

executing a plurality of driving operations of the carriage using different ones of the plurality of sets of parameters for each of the plurality of driving operations;

detecting a plurality of behaviors of the carriage in a constant speed area during each of the plurality of driving operations;

selecting one of the plurality of sets of parameters based on the plurality of detected behaviors corresponding to at least two of the plurality of driving operations; and controlling the motor for driving the carriage based on the selected one of the plurality of sets of parameters.

13. A motor control method as set forth in claim 12, wherein the selected set of parameters includes at least two parameters relating to P gain, I gain and D gain for controlling the motor by PID control and a variety of parameters that characterize a driver of the motor.

14. A motor control method as set forth in claim 12, wherein the selected one set of parameters is selected based on the plurality of detected behaviors of the carriage in the constant speed area.

15. A motor control method as set forth in claim 14, wherein the selected one set of parameters is selected based on which one of the different ones of the plurality of sets of parameters used to execute the plurality of driving operations resulted in detecting a largest minimum value of a moving speed of the carriage in the constant speed area.

16. A motor control method as set forth in claim 12, wherein the stored plurality of sets of plurality of parameters are respectively expected to be optimum in accordance with a plurality of load amounts to which a drive system of the carriage can be subjected.

17. A motor control method for driving a carriage based on one set of parameters selected from among a plurality of sets of parameters useable for driving and controlling a motor and stored by a storage device, the motor control method comprising:

executing a plurality of driving operations of the carriage using different ones of the plurality of sets of parameters;

detecting a plurality of behaviors of the carriage in a constant speed area during each of the plurality of driving operations;

detecting a temperature in a vicinity of a drive system of the carriage;

selecting one of the plurality of sets of parameters based on the detected temperatures and the plurality of detected behaviors corresponding to at least two of the plurality of driving operations; and controlling the motor for driving the carriage based on the selected one of the plurality of sets of parameters.

18. A motor control method as set forth in claim 17, wherein if the temperature detected by the temperature detection device is at or below a predetermined low temperature, a predetermined one of the plurality of sets of parameters is selected regardless of the detected behavior of the carriage in the constant speed area.

19. A motor control method as set forth in claim 17, wherein the stored plurality of sets of parameters are respectively expected to be optimum in accordance with a plurality of load amounts to which the drive system of the carriage can be subjected and the detected temperature in the vicinity of the drive system of the carriage.

* * * * *